(12) United States Patent
Wang

(10) Patent No.: US 11,873,862 B2
(45) Date of Patent: Jan. 16, 2024

(54) PLANAR HIGH-DENSITY BALL BEARING, MANUFACTURING METHOD THEREOF AND NUTATION REDUCER

(71) Applicant: Hong Jiang, Beijing (CN)

(72) Inventor: Xiaochun Wang, Beijing (CN)

(73) Assignee: Hong Jiang, Beijing (CN)

(*) Notice: Subject to any disclaimer, the term of this patent is extended or adjusted under 35 U.S.C. 154(b) by 0 days.

(21) Appl. No.: 18/218,608

(22) Filed: Jul. 6, 2023

(65) Prior Publication Data

US 2023/0340994 A1 Oct. 26, 2023

Related U.S. Application Data

(63) Continuation of application No. PCT/CN2022/131488, filed on Nov. 11, 2022.

(30) Foreign Application Priority Data

Dec. 22, 2021 (CN) .......................... 202111578984.8

(51) Int. Cl.
*F16C 33/40* (2006.01)
*F16C 19/10* (2006.01)

(52) U.S. Cl.
CPC .............. *F16C 33/40* (2013.01); *F16C 19/10* (2013.01)

(58) Field of Classification Search
CPC ...... F16C 19/10; F16C 33/3856; F16C 33/40; B29C 70/36
See application file for complete search history.

(56) References Cited

U.S. PATENT DOCUMENTS

| 449,961 A | * | 4/1891 | Simonds | ................. F16C 33/40 384/608 |
| 1,355,350 A | * | 10/1920 | Nordstrum | .............. F16C 19/10 384/614 |
| 4,620,456 A | | 11/1986 | Distin et al. | |

(Continued)

FOREIGN PATENT DOCUMENTS

| CN | 103016548 A | 4/2013 |
| CN | 106402149 A | 2/2017 |

(Continued)

OTHER PUBLICATIONS

1st Office Action of counterpart Chinese Patent Application No. 202111578984.8 dated May 11, 2022.

(Continued)

*Primary Examiner* — Alan B Waits

(57) ABSTRACT

A planar high-density ball bearing comprises a cage and balls; the cage is provided with multiple groups of ball holes for arranging the balls; the ball holes in each group are distributed in the circumferential direction of the cage in an ellipse; the centers of the ellipses in each of which a group of ball holes is distributed coincide with each other, the major axes of the ellipses lie in a common line. The ball holes in adjacent groups are arranged to be staggered in relative to each other in the circumferential direction of the cage, and the balls in the same group of the ball holes are distributed in an ellipse. A method for manufacturing the planar high-density ball bearing, nutation reducer are provided.

13 Claims, 9 Drawing Sheets

(56) References Cited

U.S. PATENT DOCUMENTS

| | | | | |
|---|---|---|---|---|
| 2016/0010688 | A1* | 1/2016 | Tate | F16C 33/40 |
| | | | | 384/608 |
| 2021/0172472 | A1* | 6/2021 | Briceno | F16C 33/40 |
| 2022/0170505 | A1* | 6/2022 | Sakoda | F16C 33/6614 |
| 2022/0397153 | A1* | 12/2022 | Briceno | F16C 19/10 |
| 2023/0264930 | A1* | 8/2023 | Kundel, Sr. | F16C 19/182 |
| | | | | 384/512 |

FOREIGN PATENT DOCUMENTS

| | | |
|---|---|---|
| CN | 113172617 A | 7/2021 |
| CN | 113692495 A | 11/2021 |
| CN | 114215844 A | 3/2022 |
| DE | 112019004147 T5 | 4/2021 |
| EP | 2012030 A1 | 1/2009 |
| EP | 3078869 A1 | 10/2016 |
| JP | H08320018 A | 12/1996 |
| JP | 2006070909 A | 3/2006 |
| JP | 2006153153 A | 6/2006 |

OTHER PUBLICATIONS

2nd Office Action of counterpart Chinese Patent Application No. 202111578984.8 dated Aug. 1, 2022.
Notice of Allowance of counterpart Chinese Patent Application No. 202111578984.8 dated Nov. 2, 2022.
International Search Report of PCT Patent Application No. PCT/CN2022/131488 dated Jan. 20, 2023.

\* cited by examiner

PLANAR HIGH-DENSITY BALL BEARING, MANUFACTURING METHOD THEREOF AND NUTATION REDUCER

CROSS REFERENCE TO RELATED APPLICATIONS

The present application is a Continuation Application of PCT Application No. PCT/CN2022/131488 filed on Nov. 11, 2022, which claims the benefit of Chinese Patent Application No. 202111578984.8 filed on Dec. 22, 2021. All the above are hereby incorporated by reference in their entirety.

TECHNICAL FIELD

The invention relates to the technical field of bearings, in particular to a planar high-density ball bearing, a manufacturing method thereof, and a nutation reducer.

BACKGROUND

Thrust bearings are widely used in various machinery. Although there have been many types of thrust bearings, very few thrust bearings have compact axial size, uniform thrust distribution, high limit speed, and are able to withstand a certain overturning moment. The axial dimension of thrust bearings with raceway members is too large, while cylindrical roller thrust bearings are not pure rolling, associated with high friction and great heat, causing it cannot be used in occasions that require high-speed operation. Therefore, only planar high-density ball thrust bearings can be more in line with the above requirements.

Compared with cylindrical roller thrust bearings, the load capacity of planar high-density ball thrust bearings is relatively low. In order to improve its load capacity, it is necessary to arrange as many ball particles as possible within a limited range, while it has to ensure that the distance between adjacent balls is not less than a predetermined value. On the other hand, the balls are in point contact with the raceway, and the contact stress is relatively large, so it is hoped that the number of balls arranged on each radius of the raceway should be as less as possible to improve the service life of the raceway. At the same time, in the case of high-speed operation, especially when the axis of the bearing is swinging while running, such as the bearing is used in a nutation reducer, it is hoped that the balls will be distributed central symmetry with respect to the bearing center to facilitate dynamic balance. In order to meet the above requirements at the same time, very high requirements are placed on the arrangement of the balls in the cage. When the planar high-density ball thrust bearing is used in the nutation reducer, the cage will also generate inertial moments and gyroscopic moments, which are balanced by the torque generated by the positive pressure exerted on the cage by the raceway, so the friction between cage and raceways is inevitable. How to reduce the frictional torque is also a challenge to the shape design of the cage.

SUMMARY

In view of this, the present disclosure proposes a planar high-density ball bearing and a manufacturing method thereof, which solve the problem that if too many balls are arranged in the cage of existing planar high-density ball thrust bearing, fatigue pitting of the raceway will occur, and if too less, it will cause the weaker load capacity of thrust bearings.

To realize the above-mentioned purpose, the present application provides:

The first aspect of the present application discloses a planar high-density ball bearing, which includes a cage and ball particles; said cage is provided with multiple groups of ball holes for arranging the balls; the ball holes in each group are distributed in the circumferential direction of the cage in an ellipse; the centers of the ellipses in each of which a group of ball holes is distributed coincide with each other, the major axes of the ellipses lie in a common line; the ball holes in adjacent groups are arranged to be staggered in relative to each other in the circumferential direction of said cage; and the ball holes in the same group are arranged to be centrosymmetric with respect to the center of the corresponding ellipse.

Further optionally, the planar high-density ball bearing as claimed in claim 1, wherein all of said multiple groups have the same number of ball holes, and any ball hole in any group of ball holes is equidistant from the nearest two ball holes in an adjacent group of ball holes.

Further optionally, all of said multiple groups have an even number of ball holes.

Further optionally, the number of said multiple groups of ball holes is n, suppose $L_i$ denotes the length of major axis of the ellipse for the group i of ball holes, $L_{i-1}$ denotes the length of major axis of the ellipse for the group i-1 of the ball holes, and $L_{i+1}$, denotes the length of major axis of the ellipse for the group i+1 of ball holes, $L_i - L_{i-1}$ is greater than $L_{i+1} - L_i$ denotes the length of minor axis of the ellipse for the group i of ball holes, $W_{i-1}$ denotes the length of minor axis of the ellipse for the group i-1 of ball holes, and $W_{i+1}$ denotes the length of minor axis of the ellipse for the group i+1 of ball holes, $W_i - W_{i-1}$ is greater than $W_{i+1} - W_i$, where i-1, i, i+1 is counted in a direction away from the center of the ellipse, and where n≥i≥2, i is a natural number.

Further optionally, disc-type raceway elements are provided at opposite sides of said cage, all the balls in said cage are sandwiched between said raceway elements, and a side of the respective raceway elements facing said balls forms a planar raceway.

Further optionally, the innermost group of ball holes has two ball holes closest to the major axis of the corresponding ellipse at the same side of the minor axis of the corresponding ellipse, wherein L1:L2 is 1:3, where L1 denotes the distance from one of said two ball holes to the major axis of the corresponding ellipse, L2 denotes the distance from the other ball hole to said major axis of the corresponding ellipse.

Further optionally, two sides of said cage are respectively formed with a number of annular corrugated protrusions extending along the circumferential direction of the cage, crests and troughs of said protrusions extend radially, two adjacent protrusions on the same side are positioned with a gap between them, a groove is formed at the gap, and said protrusions are used to form an oil film with the planar raceway.

Further optionally, the material of said cage is a fiber-reinforced composite material.

Further optionally, said cage is formed by winding fibers made of fiber-reinforced composite materials, and said fibers are cross-distributed along the circumferential direction of the cage.

The second aspect of the present application discloses a method for manufacturing the planar high-density ball bearing as claimed in claim 9, comprising:

(S1) providing several groups of winding columns on the mold according to the positions of ball holes; each group of winding columns is arranged in an ellipse; the innermost group of winding columns is denoted by A1, and the groups of winding columns are respectively denoted by A1, A2, . . . , An in the sequence from the innermost group of winding columns to the outermost group of winding columns, where n is an integer greater than or equal to 3;

(S2) First, performing the winding outwardly in the sequence from the group A1 to the group An in a staggered manner: take a side facing the center of the ellipse of any one of the winding columns in the group A1 as the starting column, and the starting point of winding is a point on that column facing the center of the ellipse; from the starting point of winding, the fibers are wound in a fixed circumferential direction of the cage in a staggered manner, and every time the fibers have passed between two columns in the same group, they go to wind the same adjacent group of winding columns in the same way in the same direction, until they come to wind the group An of winding columns where they wind at least two winding columns in the group An by passing by them in a staggered manner;

then performing the winding inwardly in the sequence from the group An to the group A1 in a staggered manner: after passing between the two winding columns of the group An, the fibers go to wind the same adjacent group in the same way in the same direction every time they have passed between two winding columns in the same group, until they come to a side of the winding column in the group A1 facing the center of the ellipse;

(S3) Repeating the winding process in step S2 in the same direction, until the wound article reaches a predetermined thickness;

(S4) Pouring epoxy resin to cure, then demoulding.

Further optionally, in the step S2, if there exists a common divisor between the number of balls at inner side of the fiber and the number of columns included in any group, then the step S2 is performed in such a manner that while passing through the winding columns included in any group, the winding is conducted in a staggered manner such that one more the columns included in any group is wound.

Further optionally, while winding the group An of winding columns in the step S2, three winding columns in the group An are passed by in a staggered manner.

The third aspect of the present application discloses a nutation reducer which comprises the planar high-density ball bearing described in the first aspect.

Beneficial effects: the present application arrange two adjacent groups of ball holes in a staggered manner, and the balls in the same group of ball holes are arranged in an ellipse, which can improve the service life of the thrust bearing and avoid earlier fatigue pitting in the raceway of the planar high-density ball bearing; at the same time, the balls are arranged in an elliptical manner, so that the same group of ball holes can be arranged as much as possible under the premise that the distance between adjacent ball holes is not less than a predetermined value, and the load capacity of the bearing is also improved.

DESCRIPTION OF DRAWINGS

The above and other objects, features and advantages of the present disclosure will become more apparent by a detailed describing in detail exemplary embodiments thereof with reference to the accompanying drawings. The accompanying drawings described below are only a part of embodiments disclosed by the present disclosure, and those skilled in the art can also obtain other drawings according to these drawings without creative work.

REFERENCE NUMERAL

Figure 1:
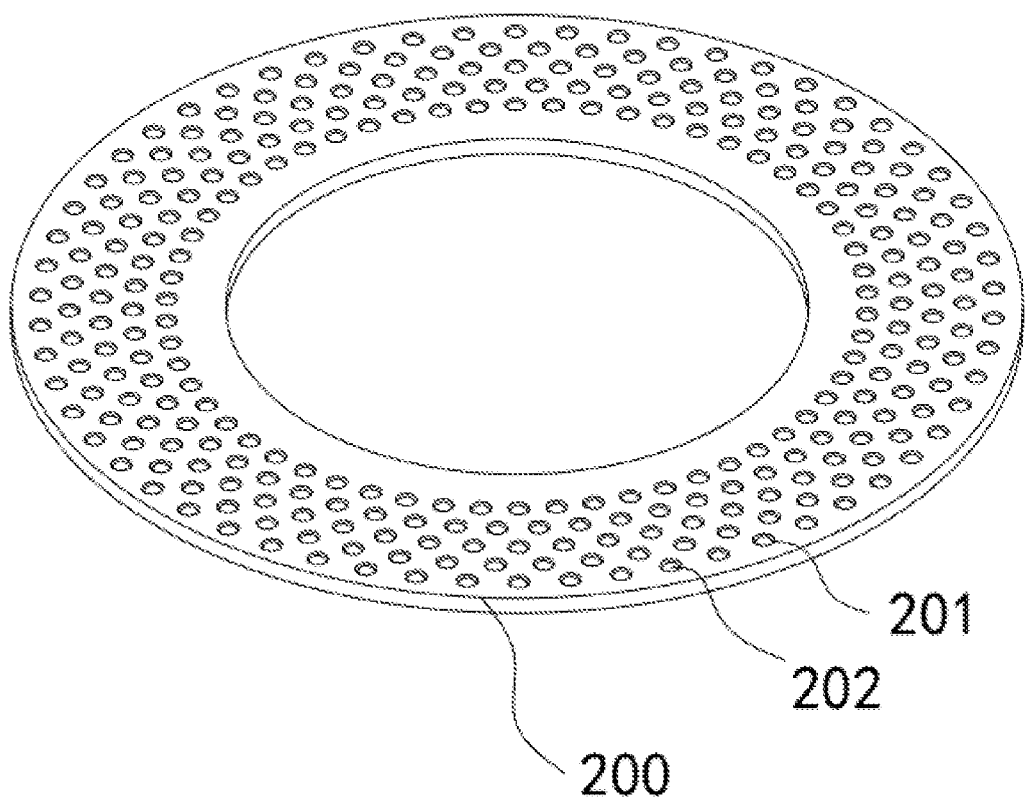
FIG. 1 shows an isometric view of the overall structure of an embodiment of the planar high-density ball bearing of the present disclosure.

200—cage; 201—ball hole; 202—ball; 203—ellipse; O—ellipse center; 204—fiber; 205—winding column.

DETAILED DESCRIPTION OF INVENTION

In order to make the purpose, technical solutions and advantages of the embodiments of the present disclosure clearer, the technical solutions in the embodiments of the present disclosure will be described clearly and completely below in conjunction with the accompanying drawings of the embodiments of the present disclosure, and it is obvious that the described embodiments are a part of the embodiments of the present disclosure, rather than all of them. Based on the embodiments in the present disclosure, all other embodiments which may be obvious to an ordinary skilled person in the art will fall within the scope of protection of the present disclosure.

The terms as used herein are solely for the purpose of describing particular embodiments and are not intended to limit the present disclosure. The singular forms of "a", "said" and "the" as used in the specification and the appended claims are also intended to include plural forms, unless the context clearly indicates otherwise. Unless the context clearly indicates otherwise, "a plurality" generally includes at least two, but does not exclude at least one.

It should be understood that the term "and/or" as used herein is simply a description of the relationship of the associated items, indicating that three relationships can be comprises, for example, A and/or B can mean: A alone, both A and B, and B alone. In addition, the character "/" herein generally indicates that the item therebefore and the item thereafter are in an "or" relationship.

It should also be noted that the term "include," "comprise," or any other variation thereof is intended to cover non-exclusive inclusion, such that a product or system that includes a set of elements includes not only those elements, but also other elements not explicitly indicated, or also other elements that are inherently included in the product or system. Unless stated otherwise, an element qualified by the statement "comprise a" does not preclude the existence of additional identical elements in the product or system including said element.

To solve the problem that if the balls of the existing planar high-density ball thrust bearing cage are arranged too much, there will be fatigue pitting in the raceway, and if too less, the load capacity of the thrust bearing will be lowered; meanwhile, there is still a problem that if the ball holes in cage of the planar high-density ball bearing are manufactured by mechanical process from composite material plate, it will split the fiber skeleton into millimeter-scale short fibers, seriously weakening the rigidity and strength of the fiber skeleton.

In the planar high-density ball bearing of the present disclosure, the balls in the same group are arranged in an ellipse, which solves the problem of earlier fatigue pitting in the raceways of the thrust bearing, and the two adjacent groups of balls are arranged in a staggered manner, so that more balls can be arranged in the cage, meanwhile, the balls can be more evenly distributed on the cage, which can improve the load capacity of the thrust bearing. The manufacturing method for the thrust bearing cage of the present disclosure uses a special interlaced winding process so that the path for each round of fiber winding do not coincide and are arranged in a staggered manner, which greatly improves the strength and rigidity of the cage.

In order to further illustrate the technical solutions of the present disclosure, the following specific embodiments are provided in conjunction with FIGS. 1-9.

Embodiment 1

Figure 2:
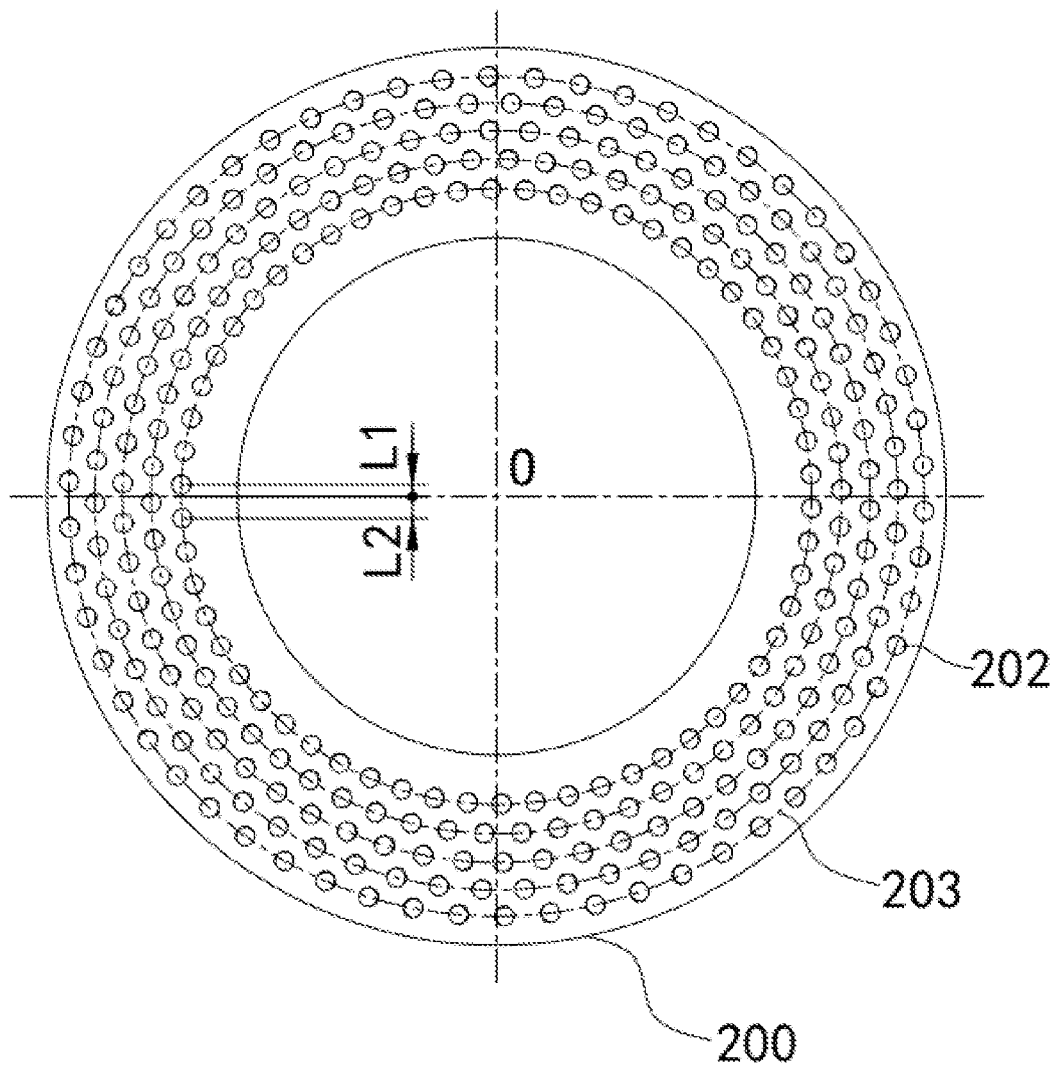
FIG. 2 shows a front view of the overall structure of the embodiment of the planar high-density ball bearing of the present disclosure.

In this embodiment, a planar high-density ball bearing is provided, as shown in FIG. 1 and FIG. 2, comprising a cage 200 and balls 202; the cage 200 is formed with multiple groups of ball holes 201 for arranging the balls 202; each group of ball holes 201 forms an elliptical track along the circumferential direction of the cage 200; the elliptical tracks formed by multiple groups of ball holes 201 share a common ellipse center O, and the major axes of elliptical tracks lie on a same straight line; every two adjacent groups of ball holes 201 are arranged to be staggered in relative to each other along the circumferential direction of the cage 200; the ball holes 201 in the same group are central symmetrical with respect to the center O of the ellipse.

Optionally, the cage 200 in this embodiment has a hollow disc structure.

The planar high-density ball bearing in this embodiment uses planes as the raceway of the balls 202. The raceway can be formed on the parts carried by the planar high-density ball bearing. Alternatively, it can be formed as a portion of the planar high-density ball bearing in this embodiment, that is, the cage 200 is provided with disc-shaped raceway elements (not shown in the figure) at its both sides, the balls on the cage 200 are sandwiched between the two raceway elements, and a side of the respective raceway elements facing toward the balls forms a planar raceway.

For the same group, the balls and ball holes are arranged in an ellipse, so that when the balls roll on the planar raceway according to the elliptical track, there are only two balls in the rolling path of the same diameter, while in the traditional perfect circular ball arrangement, the number of balls on raceway of the same diameter is the total number of balls divided by 2. By using an elliptical arrangement of the balls, earlier fatigue pitting in the raceway caused by the balls rolling is avoided.

Preferably, the number of ball holes 201 in each group is equal, and any ball hole 201 in any group of ball holes 201 is equidistant from the nearest two ball holes 201 in an adjacent group of ball holes 201. In this way, the balls can be arranged as much as possible, and the distribution of the balls can be even denser to enhance the load capacity of the bearing.

Further, the number of groups of ball holes 201 is n, let the major axis of the elliptical track formed by the group i of ball holes is $L_i$, the major axis of the elliptical track formed by the group i-1 of ball holes is $L_{i+1}$, and the major axis of the elliptical track formed by the group i+1 of ball holes is $L_{i+1}$, wherein $L_i-L_{i-1}$ is greater than $L_{i+1}-L_i$. Let the minor axis of the elliptical track formed by the group i of ball holes is $W_i$, the minor axis of the elliptical track formed by the group i-1 of ball holes is $W_{i-1}$, and the minor axis of the elliptical track formed by the group i+1 of ball holes is $W_{i+1}$, wherein $W_i-W_{i-1}$ is greater than $W_{i+1}-W_i$. The aforementioned i-1, i, and i+1 are counted in a direction away from the center of the ellipse, where n≥i≥2, where i is a natural number. In the case that the number of balls in each group is the same, the balls can be distributed as uniformly as possible to improve the load capacity.

Preferably, the groups each have an even number of ball holes 201, which can reduce the dynamic unbalance of the cage 200 in high speed situations.

Preferably, as shown in FIG. 2, the innermost group of ball holes has two ball holes closest to the major axis of the corresponding ellipse at the same side of said minor axis. The ratio of the distance from one of the two ball holes to said major axis, to the distance from the other ball hole to said major axis is L1:L2, where L1:L2 is 1:3, such that two adjacent groups of balls can be arranged in most possible staggered manner.

Preferably, in this embodiment, the distance between a ball hole in any group of ball holes and its nearest ball hole in the adjacent group is less than twice the diameter of the balls, so as to ensure that the balls are densely arranged.

Preferably, two sides of the cage are respectively formed with several ring-shaped corrugated protrusions (not shown in the figure) extending along the circumferential direction, the crests and troughs of the protrusions extend radially, two adjacent protrusions on the same side are positioned at intervals to form a groove. The ring-shaped corrugated protrusions are used to form an oil film with the plane of the planar raceway, so as to reduce the friction loss during the rotation of the cage, and also play a role of lubrication in balls rolling.

The material of the cage is fiber reinforced composite material. Specifically, the cage is formed by winding fibers made of fiber-reinforced composite materials, and the fibers are wound cross-distributed along the circumferential direction of the cage.

Embodiment 2

Figure 3:
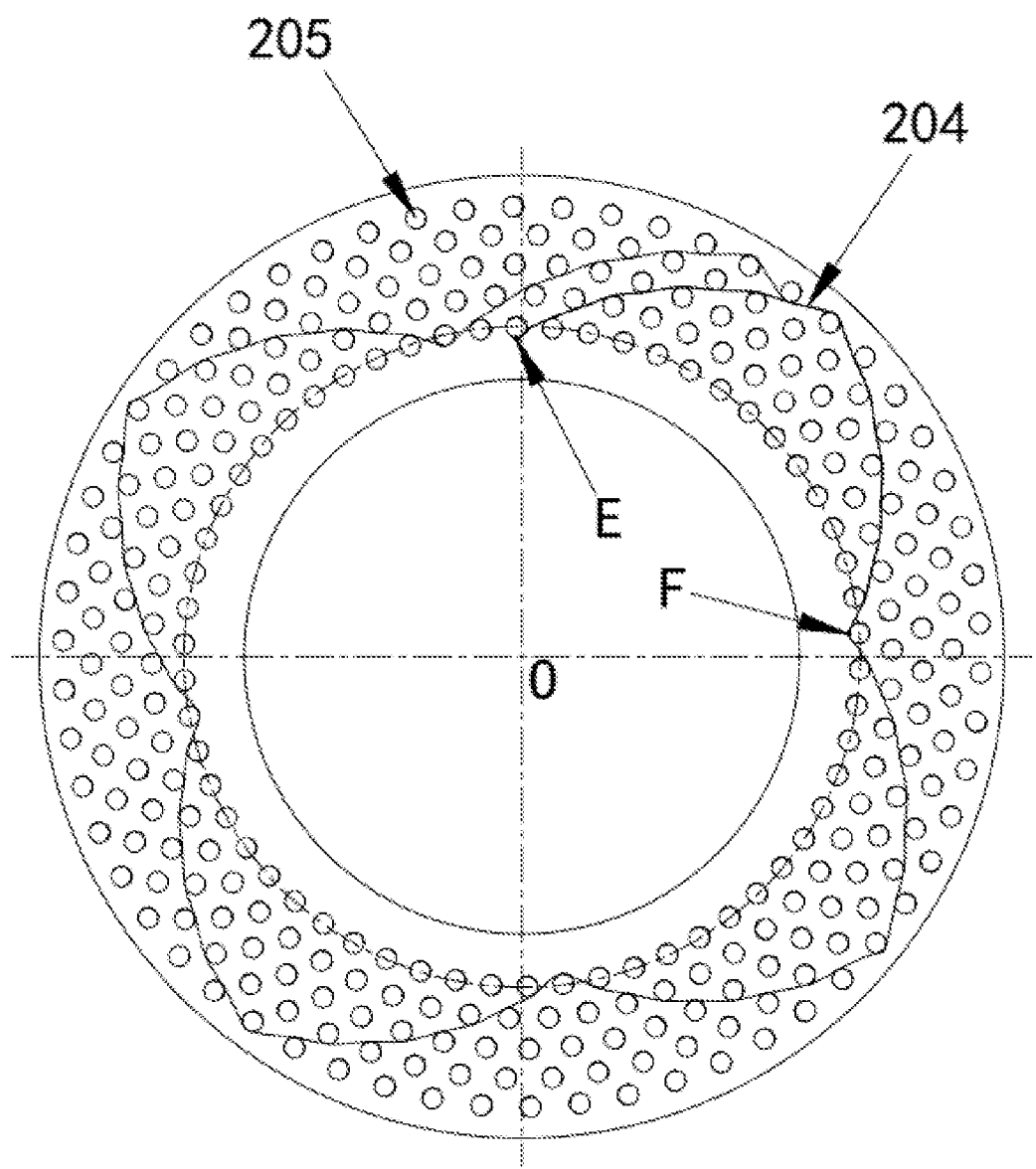
FIG. 3 shows a schematic diagram of the fiber winding process of the cage according to an embodiment of the manufacturing method for the planar high-density ball bearing of the present disclosure. In this figure, only one winding round starting from an inner column is shown to demonstrate the winding path.
Figure 4:
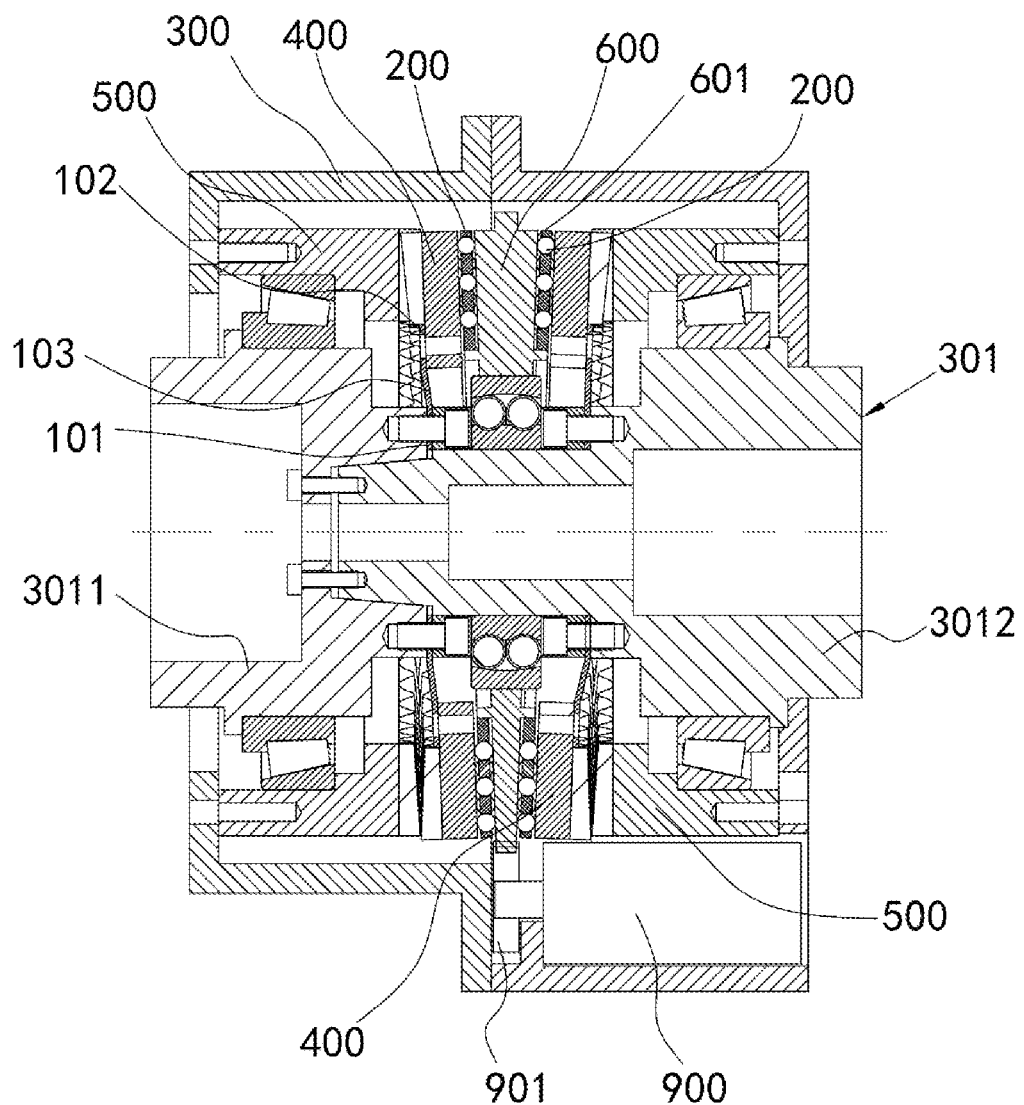
FIG. 4 shows a schematic diagram of the overall structure of the nutation reducer according to Embodiment 3 where the planar high-density ball bearing of the present disclosure is incorporated.
Figure 5:
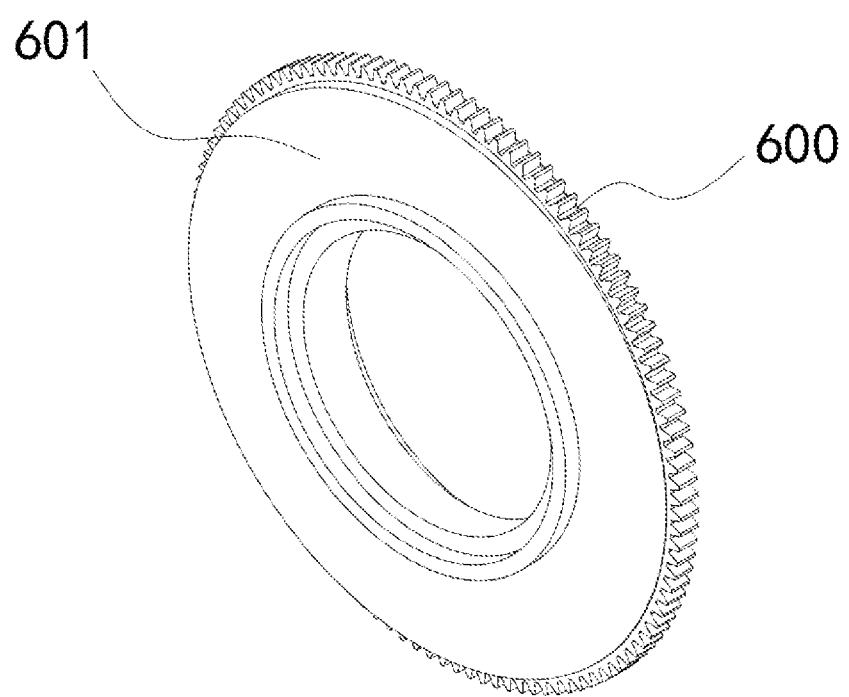
FIG. 5 shows an isometric view of the tilted disc in the embodiment presented in FIG. 4.
Figure 6:
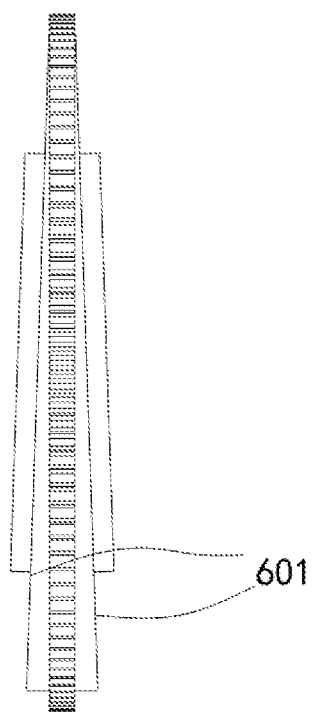
FIG. 6 shows a front view of the tilted disc in the embodiment presented in FIG. 4.
Figure 7:
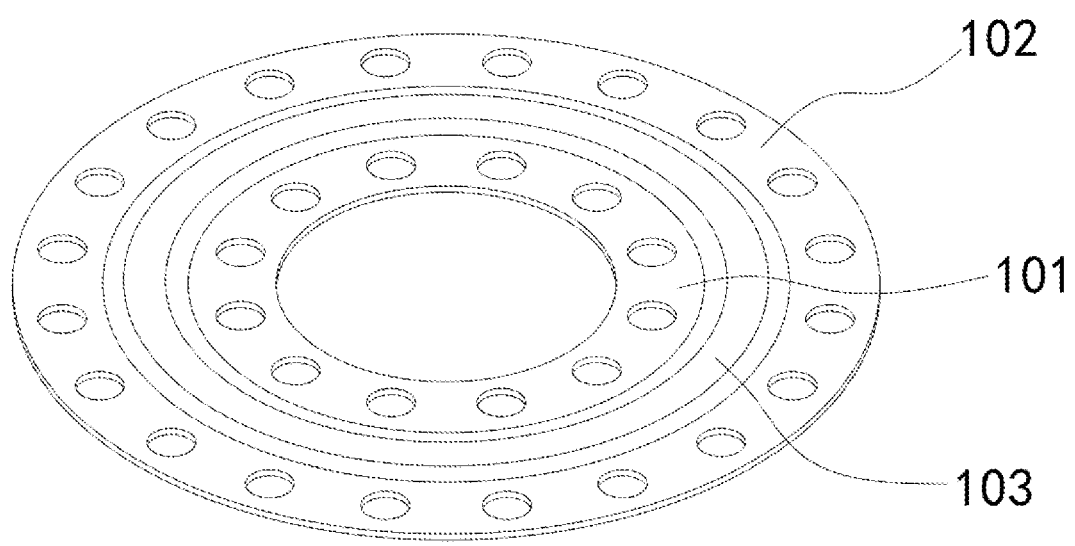
FIG. 7 shows an isometric view of the pre-stretched annular spring film in nutation reducer of the present disclosure.
Figure 8:
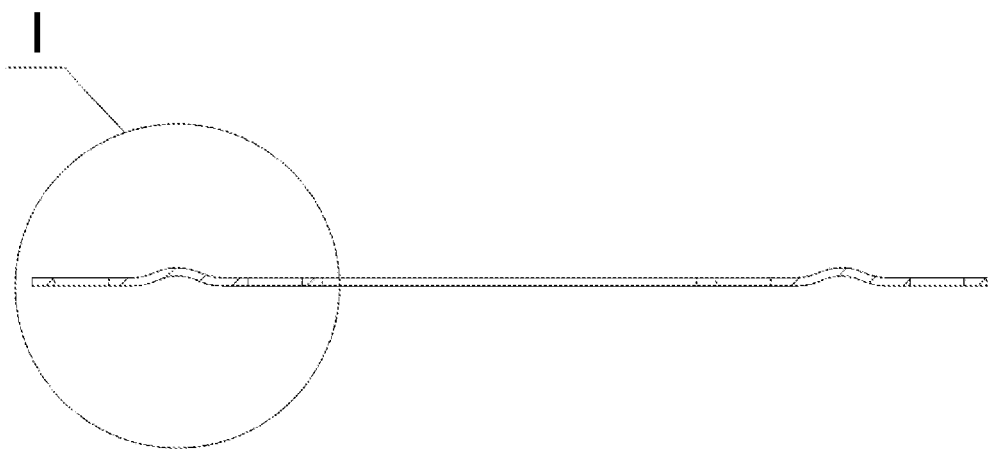
FIG. 8 shows a cross-sectional view of the pre-stretched annular spring film in FIG. 7.
Figure 9:
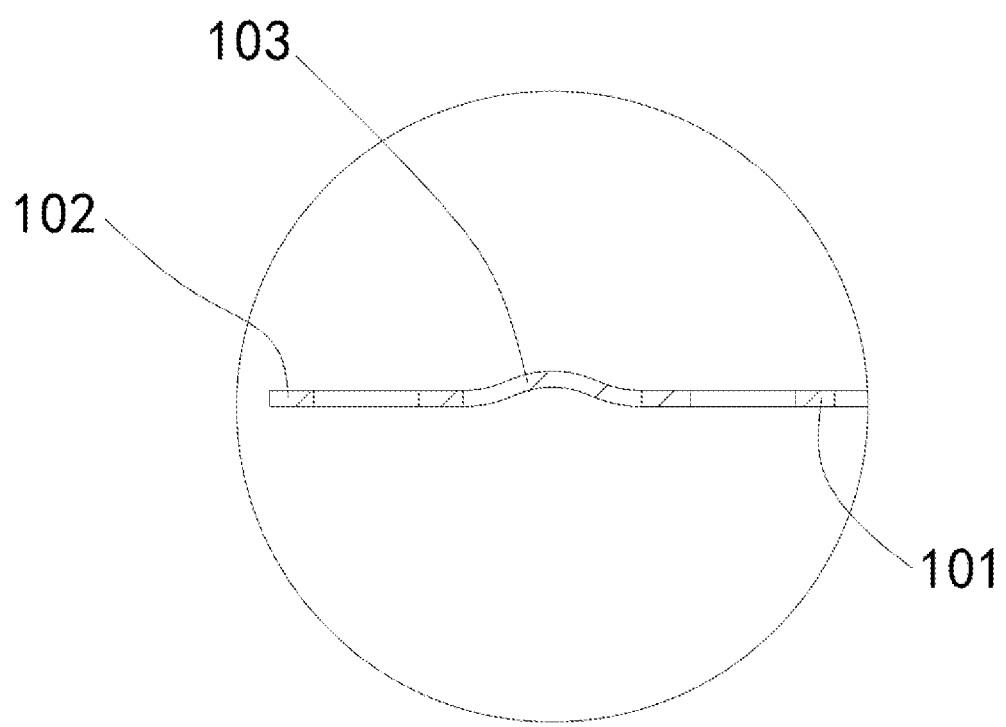
FIG. 9 shows a partially enlarged view of a part of FIG. 8 indicated by circle I.

This embodiment provides a manufacturing method for a planar high-density ball bearing exemplarily described in the embodiment 1, as shown in FIG. 3, the manufacturing method includes:

(S1) providing several groups of winding columns on the mold according to the positions of several groups of ball holes; each group of winding columns is arranged in the elliptical track; the innermost group of winding columns is denoted by A1, and the group of winding columns are respectively denoted by A1, A2, . . . , An in the sequence from the innermost group of winding columns to the outermost group of winding columns, where n is an integer greater than or equal to 3;

(S2) First, performing the winding outwardly in the sequence from the group A1 to the group An in a staggered manner: take any one of the winding columns in group A1 as the starting column, and the starting point of winding is a point on this column close to the center of the elliptic track; from the starting point of winding, the fibers are wound in a fixed circumferential direction of the cage in a staggered manner, and every time the fibers have passed between two columns in the same group, they go to wind an adjacent group of winding columns in the same way in the same direction, until they come to the group An of winding columns where they wind at least two winding columns by passing by them in a staggered manner;

Then performing the winding inwardly in the sequence from the group An to the group A1 in a staggered manner: after passing between two winding columns of the group An, the fibers go to wind the adjacent group in the same way in the same direction every time they have passed between two winding columns of the same group, until they come to a side of the column in group A1 facing the center of the elliptic track;

(S3) Repeating the winding process of step S2 in the same direction, until the wound article reaches a predetermined thickness;

(S4) Pouring epoxy resin to cure, then demoulding.

Further, in step S2, if the total number of balls located radially inside the fiber has a common divisor with the number of any group of winding columns, then the fiber winding step S2 is performed in such a manner that when the fiber is passing through this group of winding columns, it is wound in a staggered manner and the number of winding columns to be wound in this group is increased by 1. In such a manner, it ensures that the track of fibers in a winding round never coincides with that in the last winding round, and after a number of winding rounds, each winding column may have interlaced fibers around it to enhance the rigidity and strength of the ball hole. Two points E and F in the figure represent the starting and ending points, respectively, for a course of winding outwardly and then back inwardly in step S2, and if the total number of winding columns located radially inside the fibers has a common divisor with the number of winding columns in any group, the number of winding columns to be wound in this group is increased in the aforementioned manner.

Further optionally, in the step S2, while winding the group An of winding columns, three winding columns in the group An are passed by in a staggered manner.

Compared with the method of manufacturing the cage by machining, the interlaced winding method of this embodiment makes the cage have higher strength and rigidity, thereby increasing the service life of the cage.

Embodiment 3

This embodiment provides a nutation reducer, including the planar high-density ball bearing exemplarily described in Embodiment 1.

Specifically, as shown in FIGS. 4-9, the nutation reducer includes: a case 300; two nutational gear pairs arranged in the case 300, each of nutational gear pairs comprising a nutating gear 400 and a non-nutating gear 500 which are in meshing engagement with each other, wherein the non-nutating gear 500 being fixed in the case 300 or integrally formed with the case 300, and in each of the nutational gear pairs the number of teeth of the nutating gear 400 being one more than that of the non-nutating gear 500; an output shaft 301 of the reducer, which is rotatably arranged in the case 300; two pre-stretched annular spring films, each of which has an inner ring 101, an outer ring 102 and an annular elastically deformable portion 103 connected between the inner ring 101 and the outer ring 102. The inner ring 101 and the outer ring 102 each are provided with several reamed holes distributed in their respective circumferential directions, and the nutating gear in each nutational gear pair is fixed to the outer ring 102 of the spring film by first hinged bolts, which pass through the reamed holes of the outer ring 102 and fit with the reamed holes of the outer ring 102. The output shaft 301 of the reducer is fixed to the inner ring 101 of the annular spring film by second hinged bolts, which pass through the reamed holes of the inner ring 101 and fit with the reamed holes 101 of the inner ring 101. When the nutating gear performs nutational motion, said annular spring film converts the nutational motion of nutating gear into a single rotary motion of the output shaft of the reducer by means of the elastic deformation generated in the annular elastically deformable portion 103. The nutation reducer further includes an actuator for nutational movement, provided in the case 300. The two nutational gear pairs are symmetrically provided at opposite sides of the actuator for nutational movement, and the actuator is used to drive the nutating gear 400 to perform nutational motion, so that the teeth of the nutating gear 400 roll on the teeth of the non-nutating gear 500.

In this embodiment, the radial positioning of the annular spring film and the torque transmission functions are realized by the first hinged bolt fitting with the reamed holes of the outer ring and the second hinged bolts fitting with the reamed holes of the inner ring. Preferably, the first hinged bolts fit the reamed holes of the outer ring with clearance, and the second hinged bolts fit the reamed holes of the inner ring with clearance.

It should be noted that in this embodiment, the teeth of the nutating gear 400 and the teeth of the non-nutating gear 500 are formed on one end face of the respective toothed discs, and the respective teeth extend along the radial direction of the respective toothed discs. The longitudinal cross-sectional area of each tooth gradually increases from the tip to the root, and the cross-sectional area of each tooth gradually decreases from the outside to the inside along the radial direction of the respective toothed discs, and the tooth width is the distance between the inner circle end surface of the tooth and the outer circle end surface of the tooth.

Optionally, the teeth of the nutating gear 400 and the teeth of the non-nutating gear 500 are distributed on one side of the end face of the respective toothed discs, and the width direction of the teeth of the nutating gear 400 corresponds to the radial direction of the nutating gear 400, and the width direction of the teeth of the non-nutating gear 500 corresponds to the radial direction of the non-nutating gear 500.

The actuator of nutational movement includes: a tilted disc 600, which is rotationally provided on the output shaft 301 of the reducer in the case 300, two tilted planes 601 being symmetrically formed on opposite sides of the tilted disc, and the tilted disc 600 being driven to rotate by a driving mechanism; the planar high-density ball bearings 200, provided between the tilted disc 600 and a corresponding side of the nutating gear 400 in each of nutational gear pairs. The two sides of the tilted disc 600 and the respective back sides of said nutating gears 400 of the two notational gear pairs are used as the raceways for the planar high-density ball bearing 200. The two nutating gears 400 in the two nutational gear pairs have the same tooth number, and the two non-nutating gears 500 in the two nutational gear pairs have the same tooth number. When the titled disc 600 rotates, the tilted planes 601 on both sides of the tilted disc 600 drive the nutating gears 400 to perform nutational movement, so that the teeth of the nutating gears 400 roll on the teeth of the non-nutating gears 500. The two non-nutating gears 500 in the nutational gear pairs have the same tooth number to ensure that the output speed is the same, and the nutating angles of the two nutating gears 400 are the same, so that a single tilted disc 600 can drive the two nutating gears 400 at the same time to generate nutational movement, meanwhile, the problem of uneven thrust on both sides of the tilted disc 600 is offset, so that the axis of the tilted disc 600 maintains coaxial with the output shaft of the reducer.

Said drive mechanism includes a motor and a transmission mechanism including transmission gears. The outer circumference of the tilted disc 600 is formed with a plurality of gear teeth evenly distributed along its circumferential direction. The motor shaft is fixed to the gear in meshing engagement with the gear teeth on the tilted plate 600 for transmission.

In this embodiment, the tilted planes of the tilted disc 600 drive the nutating gears 400 to perform nutational movement through the planar high-density ball bearings, wherein the planar high-density ball bearings have multiple groups of balls, and the back sides of the nutating gears 400 and the tilted planes of the tilted disc serve as the raceways of the planar high-density ball bearings, the raceways are planar raceways; since the balls are distributed in elliptic tracks, earlier fatigue pitting in the back sides of the nutating gears 400 and tilted planes can be avoided; meanwhile high-density arrangement of the balls can improve the load capacity of the planar high-density ball bearings.

The foregoing specifically illustrates and describes exemplary embodiments of the present disclosure. It is to be understood that the present disclosure is not limited to the detailed structures, set-ups, or methods of implementation described herein; rather, the present disclosure is intended to cover a variety of modifications and equivalents that are within the spirit and scope of the appended claims.

The invention claimed is:

1. A planar high-density ball bearing comprising a cage and balls; said cage is provided with multiple groups of ball holes for arranging the balls; the ball holes in each group are distributed in the circumferential direction of the cage in an ellipse; the centers of the ellipses in each of which a group of ball holes is distributed coincide with each other, the major axes of the ellipses lie in a common line; the ball holes in adjacent groups are arranged to be staggered in relative to each other in the circumferential direction of said cage; and the ball holes in the same group are arranged to be centrosymmetric with respect to the center of the corresponding ellipse.

2. The planar high-density ball bearing as claimed in claim 1, wherein all of said multiple groups have the same number of ball holes, and any ball hole in any group of ball holes is equidistant from the nearest two ball holes in an adjacent group of ball holes.

3. The planar high-density ball bearing as claimed in claim 2, wherein all of said multiple groups have an even number of ball holes.

4. The planar high-density ball bearing as claimed in claim 1, wherein the number of said multiple groups of ball holes is n, suppose $L_i$ denotes the length of the major axis of the ellipse for the group i of ball holes, $L_{i-1}$ denotes the length of the major axis of the ellipse for the group i−1 of the ball holes, and $L_{i+1}$, denotes the length of the major axis of the ellipse for the group i+1 of ball holes, $L_i-L_{i-1}$ is greater than $L_{i+1}-L_i$, $W_i$ denotes the length of the minor axis of the ellipse for the group i of ball holes, $W_{i-1}$ denotes the length of the minor axis of the ellipse for the group i−1 of ball holes, and $W_{i+1}$, denotes the length of the minor axis of the ellipse for the group i+1 of ball holes, $W_i-W_{i-1}$ is greater than $W_{i+1}-W_i$, where i−1, i, i+1 is counted in a direction away from the center of the ellipse, and where n≥i≥2, i is a natural number.

5. The planar high-density ball bearing as claimed in claim 1, wherein disc-type raceway elements are provided at opposite sides of said cage, all the balls in said cage are sandwiched between said raceway elements, and a side of the respective raceway elements facing said balls forms a planar raceway.

6. The planar high-density ball bearing as claimed in claim 1, wherein the innermost group of ball holes has two ball holes closest to the major axis of the corresponding ellipse at the same side of the minor axis of the corresponding ellipse, wherein L1:L2 is 1:3, where L1 denotes the distance from one of said two ball holes to the major axis of the corresponding ellipse, L2 denotes the distance from the other ball hole to said major axis of the corresponding ellipse.

7. The planar high-density ball bearing as claimed in claim 1, wherein two sides of said cage are respectively formed with a number of annular corrugated protrusions extending along the circumferential direction of the cage, crests and troughs of said protrusions extend radially, two adjacent protrusions on the same side are positioned with a gap between them, a groove is formed at the gap, and said protrusions are used to form an oil film with the planar raceway.

8. The planar high-density ball bearing as claimed in claim 1, wherein the material of said cage is a fiber-reinforced composite material.

9. The planar high-density ball bearing as claimed in claim 8, wherein said cage is formed by winding fibers made of fiber-reinforced composite materials, and said fibers are cross-distributed along the circumferential direction of the cage.

10. A method for manufacturing the planar high-density ball bearing as claimed in claim 9, comprising:

(S1) providing several groups of winding columns on the mold according to the positions of ball holes; each group of winding columns is arranged in an ellipse; the innermost group of winding columns is denoted by A1, and the groups of winding columns are respectively denoted by A1, A2, . . . , An in the sequence from the innermost group of winding columns to the outermost group of winding columns, where n is an integer greater than or equal to 3;

(S2) First, performing the winding outwardly in the sequence from the group A1 to the group An in a staggered manner: take a side facing the center of the ellipse of any one of the winding columns in the group A1 as the starting column, and the starting point of winding is a point on that column facing the center of the ellipse; from the starting point of winding, the fibers are wound in a fixed circumferential direction of the cage in a staggered manner, and every time the fibers have passed between two columns in the same group, they go to wind the same adjacent group of winding columns in the same way in the same direction, until they come to wind the group An of winding columns where they wind at least two winding columns in the group An by passing by them in a staggered manner;

then performing the winding inwardly in the sequence from the group An to the group A1 in a staggered manner: after passing between the two winding columns of the group An, the fibers go to wind the same adjacent group in the same way in the same direction every time they have passed between two winding columns in the same group, until they come to a side of the winding column in the group A1 facing the center of the ellipse;

(S3) Repeating the winding process in step S2 in the same direction, until the wound article reaches a predetermined thickness;

(S4) Pouring epoxy resin to cure, then demoulding.

11. The method as claimed in claim 10, wherein in the step S2, if there exists a common divisor between the number of balls at inner side of the fiber and the number of winding columns included in any group, then the step S2 is performed in such a manner that while passing through the winding columns included in any group, the winding is conducted in a staggered manner such that one more the columns included in any group is wound.

12. The method as claimed in claim 11, wherein while winding the group An of winding columns in the step S2, three winding columns in the group An are passed by in a staggered manner.

13. A nutation reducer which comprises the planar high-density ball bearing claimed in claim 1.

* * * * *